Feb. 11, 1941.   O. F. BAUER   2,231,747
CHIP REMOVING APPARATUS
Filed Aug. 10, 1939   3 Sheets-Sheet 1

INVENTOR
Oliver F. Bauer
BY
ATTORNEY

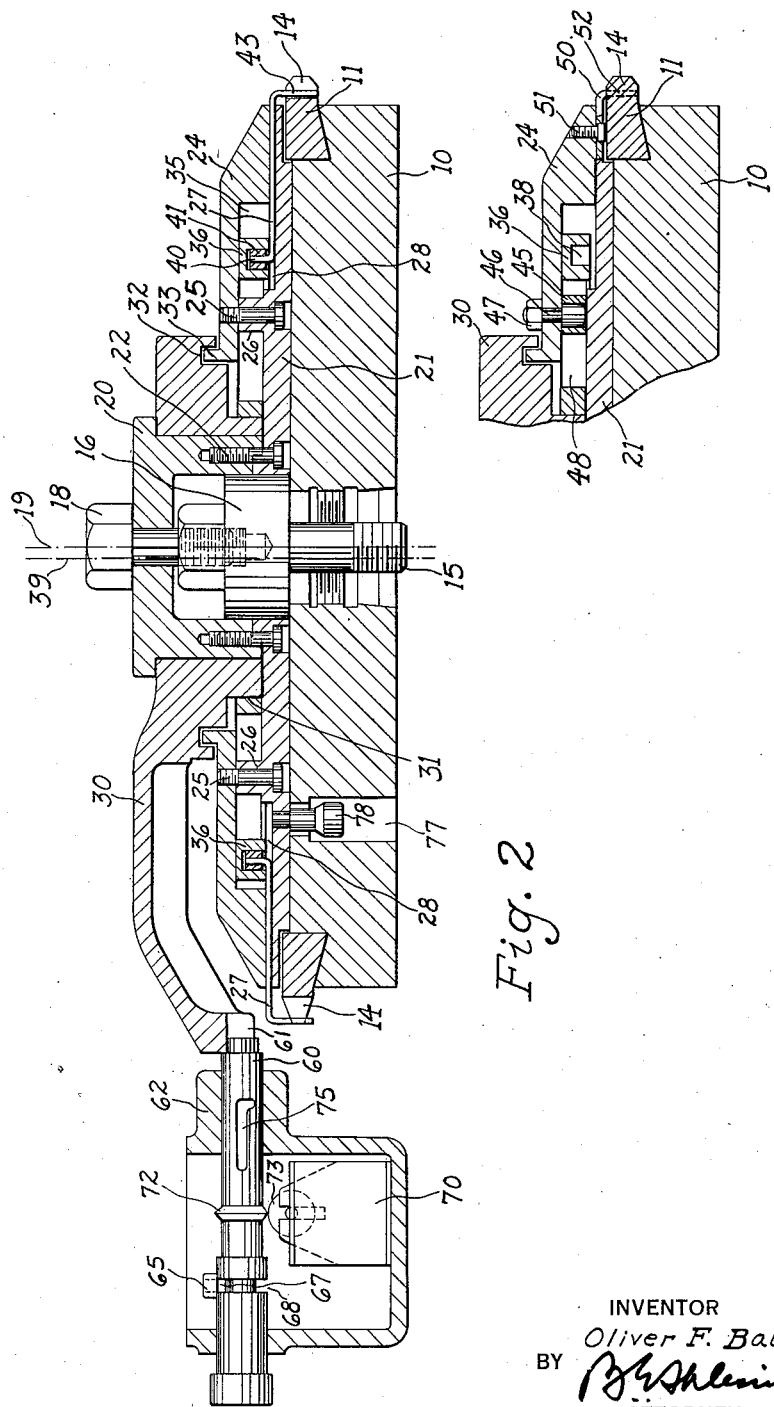

Feb. 11, 1941. O. F. BAUER 2,231,747
CHIP REMOVING APPARATUS
Filed Aug. 10, 1939 3 Sheets-Sheet 3

INVENTOR
Oliver F. Bauer
BY
ATTORNEY

Patented Feb. 11, 1941

2,231,747

UNITED STATES PATENT OFFICE 2,231,747

CHIP REMOVING APPARATUS

Oliver F. Bauer, East Rochester, N. Y., assignor to Gleason Works, Rochester, N. Y., a corporation of New York Application August 10, 1939, Serial No. 289,441

7 Claims. (Cl. 90—3)

The present invention relates to the cutting of gears and particularly to apparatus for removing chips from a multi-bladed disc-type gear cutter during cutting.

During the past few years, a number of new rotary gear cutters have been developed for cutting gears at high speeds. Each of these cutters is provided with a large number of cutting blades so as to remove a maximum amount of stock per revolution of the cutter. To keep the diameter of the cutters at a minimum, the blades are placed close together and for this reason, the segmental type cutter has come more and more into use since in such a cutter a greater number of cutting blades can be provided for a given diameter than in an inserted type of cutter. With the increase in number of cutting blades, however, the space between the successive blades has necessarily been diminished with the result that, especially at the high speeds of rotation at which the new cutters are adapted to operate, there is a tendency for chips to pack in between the blades, causing scratching of the tooth surfaces being cut and occasionally causing breakage of the cutting blades themselves.

Previous known methods for preventing chips from clinging to the blades of a cutter and previous types of chip removers have proved ineffective in preventing the chips clinging to and packing in between the blades of the new type high speed gear cutters.

The purpose of the present invention is to provide a chip removing apparatus which will be positive in operation and which will operate to sweep across the face of a blade of a cutter after each cut taken by the blade so as to brush off the blade any chip that may cling to the blade after it has taken a cut. With the apparatus of the present invention, then, all possibility of packing of chips between the blades of a cutter is obviated.

The invention may have various embodiments and may be used with various types of cutters. In the drawings, two different embodiments of the invention are shown, each constructed for use with a rotary disc-type gear cutter of the "Revacycle" type.

In the drawings:

Fig. 2 is a transverse sectional view of the parts shown in Fig. 1;

Fig. 3 is a fragmentary sectional view on the line 3—3 of Fig. 1, looking in the direction of the arrows;

Figure 1:
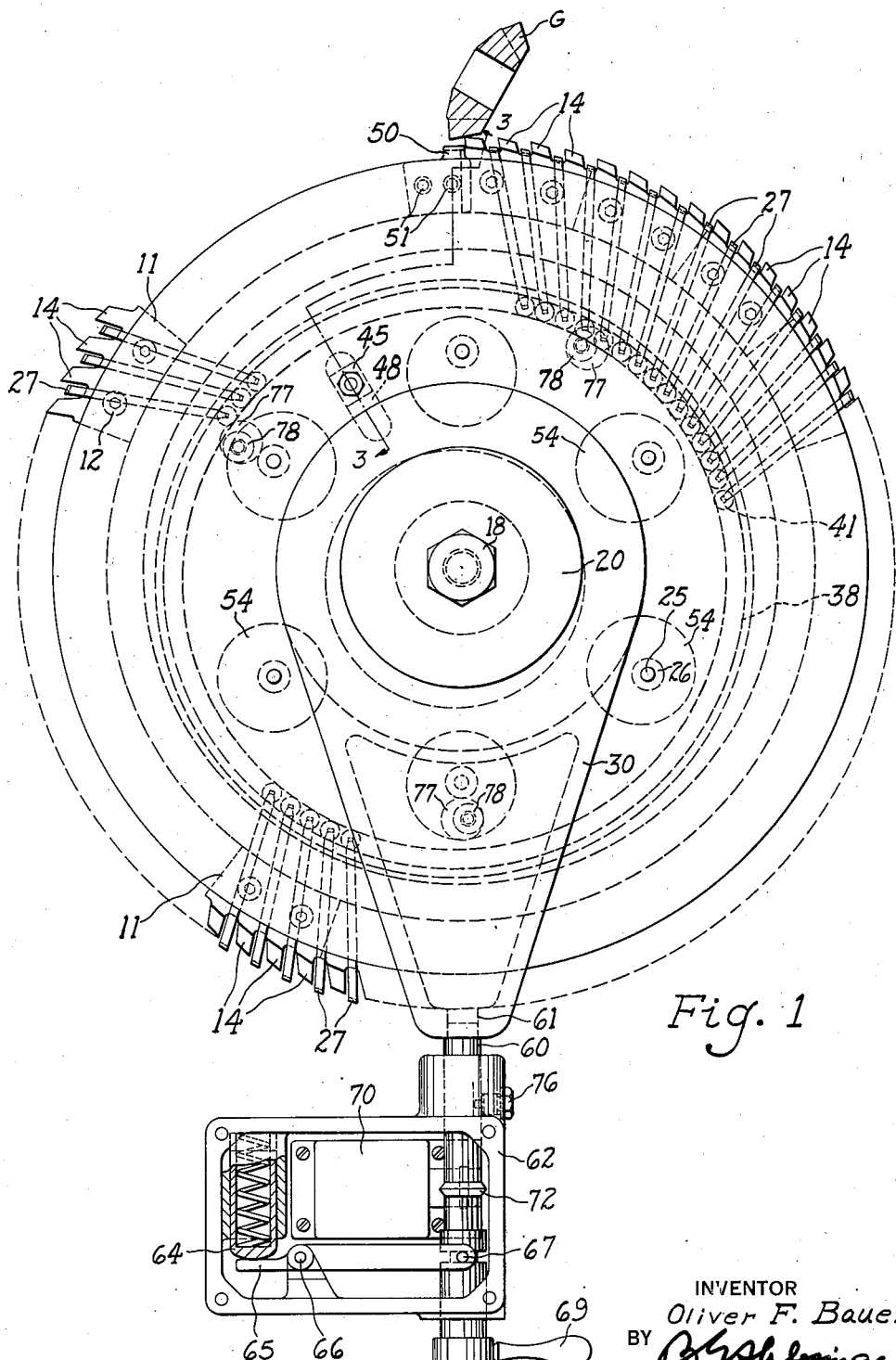
Fig. 1 is a plan view, showing a chip-removing apparatus constructed according to one embodiment of this invention mounted on a "Revacycle" type gear cutting machine for use with the cutter of that machine.

In the mechanisms illustrated in the drawings, there is a wiping finger provided for each blade of the cutter with which the chip-removing apparatus is to be used. The several wiping fingers are assembled in a head that is secured to the cutter to rotate therewith. The fingers are so mounted in the head that each projects into the space between successive blades of the cutter and each finger is, therefore, associated with a particular blade of the cutter. The fingers are slidably mounted in the head and on each revolution of the cutter, each finger is moved forward and back so that it will knock off the blade with which it is associated any chip that might have clung to the blade when the blade took its cut.

In one of the illustrated embodiments of the invention, each finger is separately mounted in the head and the fingers are moved individually to effect the chip-removing operation. In the other embodiment shown, a plurality of fingers are made integral with one another and each group of fingers, when actuated, will remove the chips from a plurality of blades simultaneously.

In each of the illustrated embodiments of the invention, a stationary cam member is provided to operate the fingers. In one case, the cam member has a peripheral surface eccentric of the axis of rotation of the cutter. A plate having an eccentric bore is rotatably mounted on this cam member and is connected to the head that carries the fingers to rotate with the head and the cutter. This plate has a circular groove in it concentric with its bore. There is a disc secured to each of the fingers and the several discs engage in this groove. As the cutter rotates, then, rotating the plate also, the fingers are moved alternately outwardly and inwardly to effect the chip-removing action, the extent of their movement being determined by the eccentricity of the cam.

In the other embodiment of the invention illustrated, the stationary cam is provided with a circular groove or slot eccentric of the axis of rotation of the cutter and the fingers have rollers that engage in this slot so that as the cutter rotates, the fingers are moved alternately inwardly and outwardly to effect the chip-removing operation.

Reference will now be had to the drawings for a more complete description of the invention, and the embodiment illustrated in Figs. 1 to 3 inclusive will be described first.

10 denotes the body and 11 the cutting segments of a standard disc type segmental gear cutter, for instance, a "Revacycle" cutter. The segments are secured to the body of the cutter by screws 12 and in the embodiment illustrated, there are four cutting blades 14 integral with each segment. The cutting blades are of varying height as required in a "Revacycle" cutter for cutting bevel gears.

The cutter is secured to the cutter spindle of the gear cutting machine (not shown) by a bolt 15 which has an enlarged head 16.

Secured to the head 16 of the bolt 15, as by means of a bolt 18 which threads into the head 16, is a bushing or cylindrical bearing member 20. A plate or head 21 is secured to the bearing member 20 by screws 22. This plate is also provided with a central bore to fit over the head 16 of the bolt 15.

A second plate 24 is secured to the plate 21 by screws 25. This second plate is recessed as indicated at 35 for a purpose which will hereinafter appear and it rests upon the cylindrical spacer-lugs 26 that are formed integral with the plate 21. The screws 25 pass through openings provided in these spacer-lugs.

There are a plurality of grooves 28 formed in the upper face of the plate 21 which constitute guideways or channels in which are reciprocably mounted a plurality of chip-removing fingers 27. The plate 24 acts as a cover-plate to retain these fingers in their grooves.

There is a finger 27 provided for each blade 14 of the cutter except the first blade. Each finger is made of strap metal and is bent at right angles in opposite directions at opposite ends to form an upwardly projecting portion 40 and a downwardly projecting portion 43. The upwardly projecting portion 40 carries a roller 41. The downwardly projecting portion 43 lies in the space between two successive blades of the cutter extending from one side of a blade to another. It serves as a scraper and when the finger is actuated will knock off the front-face of the blade any chip that may have adhered thereto.

In the embodiment of the invention illustrated, the grooves 28 in the plate 21 are oblique, that is, non-radial of the axis 19 of the cutter head. They are so made in order that each finger 27 may lie and be more substantially parallel to the front face of a blade of the cutter. The blades 14 of the cutter shown have hooked (non-radial) front faces.

The bushing or bearing member 20 is rotatably mounted in an arm 30 which is provided with a hole or opening to receive the bushing. This arm is formed with a cylindrical external bearing surface 31 that, however, is eccentric of the bearing surface of the bushing 20 and of the axis 19 of rotation of the cutter head 10. The center of the bearing surface 31 is indicated at 39.

The arm 30 is formed on its underface with a cylindrical groove 32 that is adapted to receive a cylindrical flange 33 which is formed integral with the plate 24. Both the groove 32 and the flange 33 are concentric with the axis 19 of the cutter head and they constitute together a labyrinth to prevent entry of chips into the operating parts of the mechanism.

The plate 24 is recessed on its under face as already indicated at 35. In this recess and between the plates 21 and 24 there is mounted a cam or control plate 36. This cam plate is mounted to slide relative to the plates 24 and 21 and is formed with a bore eccentric of the axis 19 of the cutter head and concentric of the axis 39 to fit over the eccentric bearing surface 31 of the arm 30.

There is a circular groove 38 formed in the cam plate 36 concentric with the center 39 of the bore of the cam plate. The rollers 41 carried by the fingers 27 engage in this groove 38.

The cam-plate 36 is adapted to be rotated on rotation of the cutter, the drive being through a block 45 (Figs. 1 and 3) which is carried by a stud 46 that is connected by the nut 47 to the cover-plate 24. The block 45 engages in an elongated slot 48 formed in the cam plate 36.

During operation of the apparatus, the arm 30 is held against rotation by means which will later be described. Hence, as the cutter head rotates, the plate 36 will move eccentrically of the plates 21 and 24. This eccentric movement of the plate 36 will cause the rollers 41 of the fingers 27 to move radially of the axis 19 of the cutter, causing each finger 27 to be moved alternately inwardly and outwardly across the face of the blade of the cutter with which it is associated, as the cutter rotates.

In Fig. 1, we have shown the cutter in position where the first blade of the cutter is just taking its cut in a bevel gear blank G. The cam-plate 36 is initially positioned angularly relative to the plates 21 and 24 so that as each blade of the cutter goes through the cut in the gear blank, the scraper portion 43 of the finger 27 associated with that blade will be in the bottom of the spaces between two successive blades so as not to strike the blank. After each blade passes through the cut, however, the eccentricity of the groove 38 with reference to the axis of rotation of the cutter will cause the finger 14 to be moved outwardly, causing the surface-portion 43 of the finger to be passed completely across the face of the cutter blade from the bottom to the top thereof. Thus, any chip which may have adhered to the blade as it took its cut is wiped off the blade. In the upper left hand corner Fig. 1, several fingers 27 are shown just beginning to move outwardly. In the lower left hand corner of Fig. 1, several fingers 27 are shown which have practically reached the limit of their outward movements. From there on, as the cutter rotates, the fingers are gradually retracted, returning to the positions shown in the upper right hand corner of Fig. 1.

It is desirable, of course, to adjust the fingers relative to the blades with which they are associated so that they will move as close as practicable to the front faces of these blades. To properly position the fingers and to assist in maintaining the proper relation between the several fingers and blades after the cutter has been sharpened, a gauge 50 is provided. This may be in the form of a finger associated with the first blade of the cutter. It is secured to the plate 24 by screws 51. By manually rotating the plate 24 so that the downwardly projecting portion 52 of this finger is engaged with the front face of the first blade 14 of the cutter, each of the other fingers 27 will have the correct working relation to each of the other blades 14 of the cutter. After sharpening the cutter, then, all that is necessary to do is to rotate the plate 24 manually so as to bring the gauge finger 50 again into contacting relation with front face of the first blade of the cutter and each of the other fingers will again have the proper operative relation with the other blades of the cutter. To permit this angular adjustment, the disc 36 is formed with a plurality of circular slots 54. The spacer lugs 26 of the plate 21 fit into these slots.

To take the cutter off of the machine when it has to be sharpened, it is necessary to remove the bolt 18. Then the whole chip removing mechanism may be lifted off of the cutter. For convenience in disassembling and reassembling again, the arm 30 is made so that it can be lifted off with the chip removing mechanism. To hold it against rotation when the chip-removing mechanism is in use, a locking bar 60 is provided. The head of this bar is adapted to engage in a recess 61 formed on the under side of the arm 30. The bar itself is mounted to slide in a bracket 62 which is secured in any suitable manner to a stationary part of the gear cutting machine. The bar is resiliently held in engagement with the arm 30 through operation of a spring-pressed plunger 64 which engages with the short arm of a lever 65. This lever 65 is pivoted at 66 in the bracket 62 and carries a pin 67 at its free end which engages in a groove 68 formed in the bar. The bar may be manually retracted from operative position by a handle 69 which is secured to it.

After a new cutter or the sharpened cutter has been put on the machine, the chip-removing mechanism is simply slipped over the head 16 of the bolt 15, is bolted on by the bolt 18, and it is again ready for use. To assist in readily locating the chip-removing mechanism in its proper angular relation to the cutter, each cutter head 10 is provided with three holes 77. These are spaced at non-equal angular distances from one another. To the plate 21 there are secured three buttons 78 which are also spaced at non-equal angular distances from one another, corresponding to the distances between the holes 77. The chip-removing mechanism can, then, be assembled only in one position on a cutter with the several fingers of the chip-removing mechanism in proper angular registry with the several blades of the cutter.

To insure that the bar 60 is engaged with the arm 30 so as to hold the arm 30 against rotation during operation of the machine a limit-switch 70 is provided. This is secured in the bracket 62 and the plunger is provided with double beveled circular ridge 72 that is adapted to engage the roller 73 of this switch.

The switch, which is a normally open switch is incorporated in the starting circuit of the gear cutting machine and the machine cannot be started unless it is closed. When the bar 60 is in locking engagement with the arm 30, the ridge 72 engages roller 73 to depress it and close the switch so that the machine may be started.

When the chip-removing mechanism is to be removed, the bar 60 is retracted by pulling on the handle 69. A bayonet slot 75 is formed in one side of the bar and a pin 76, which is secured in the bracket 62, engages this slot. After the bar has been retracted, it may be rotated by the handle 69 so that the pin engaging in the offset portion of the slot may hold the bar in retracted position.

Figure 4:
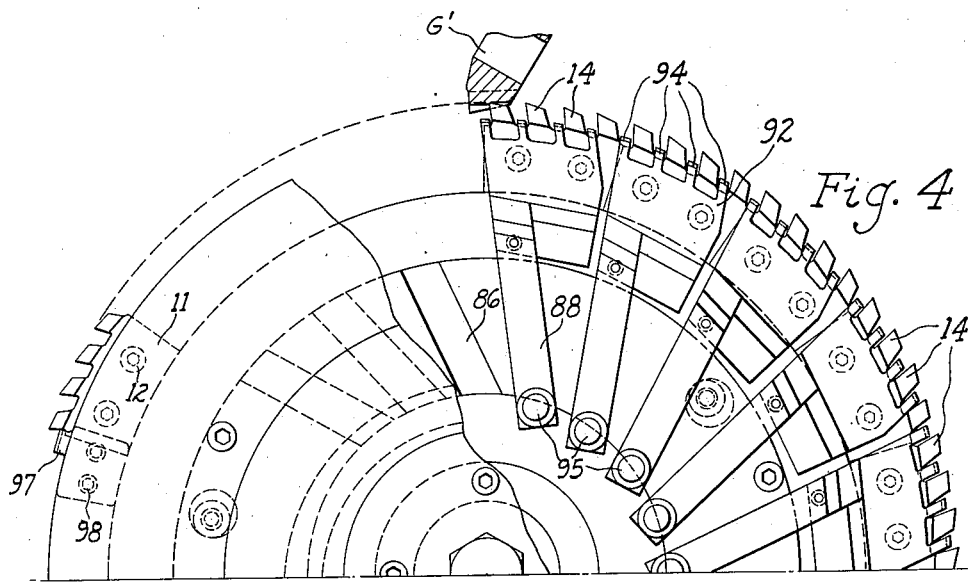
Fig. 4 is a fragmentary plan view showing a modified embodiment of the invention mounted on a "Revacycle" cutter for use therewith.
Figure 5:
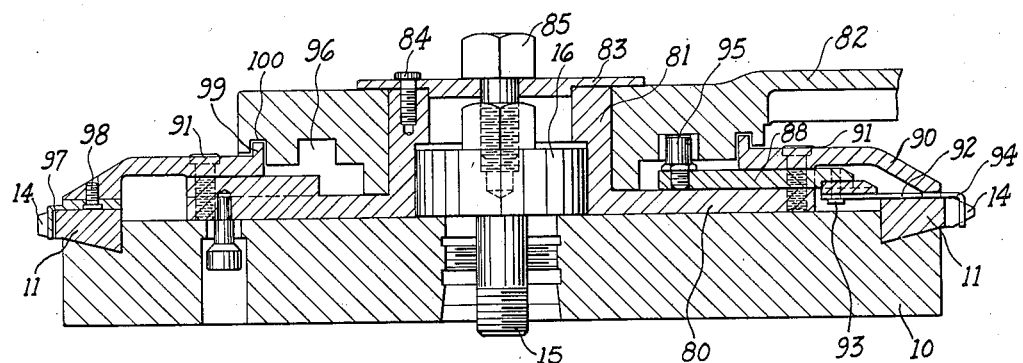
Fig. 5 is a transverse sectional view of the parts shown in Fig. 4.

A modification of the invention is illustrated in Figs. 4 and 5. 10 again denotes the cutter head, 11 the cutting segments, 14 the cutting blades or teeth, 15 the securing bolt, and 16 its head.

The chip-removing apparatus includes a plate 80 which is formed with a hub portion 81 that is bored to fit over the enlarged head 16 of the bolt 15. This hub portion 81 is received within the bore of an arm 82 which, like the arm 30, is adapted to be held stationary during the operation of the cutter. There is a disc 83 fastened to the upper end of the hub portion 81 of the plate 80 by screws 84. A bolt 85 which passes through this disc serves to connect the plate 80 to the cutter so that it will rotate therewith.

The plate 80 is provided with a plurality of oblique slots 86. Strap members 88 are mounted in these slots to slide therein. They are held in the slots by a cover plate 90 which is secured to the plate 80 by screws 91.

To each of the strap members 88 there is secured a scraper-member 92 by a screw 93. Each of the members 92, except that associated with the first segment 11 of the cutter, has four chip-removing fingers 94 formed integral with it. The first chip-removing member will have but three fingers. The chip-removing fingers engage in the spaces between successive blades of the cutter.

Each of the strap members 88 also carries a stud or pin 95. The several studs or pins 95 engage in a circular slot 96 that is formed on the under side of the arm 82 eccentric of the axis of rotation of the cutter. Hence, as the cutter rotates, each pin 95 is moved radially of the cutter axis so that the fingers 94 are moved alternately outwardly and inwardly to remove from the blades of the cutter any chips that may have adhered thereto during cutting.

As before, a gauge finger 97 may be provided to insure proper spacing of the several chip-removing fingers 94 from the front faces of the cutting blades or teeth of the cutter. The gauge finger 97 is secured to the cover plate 90 by screws 98.

The cover plate 90 is provided with a circular flange 99 which fits into a circular groove 100 formed in the arm 82 to provide a labyrinth to prevent chips from getting into the operating part of the mechanism.

As before, the chip-removing mechanism is so positioned angularly relative to the cutter that each chip-removing finger 94 will be in the bottom of the space between successive blades of the cutter when the blade with which that finger is associated is passing through the tooth slot of the gear C' which is being cut. As the cutter rotates, also, each scraper-member 92 will be moved first outwardly to sweep off any chips that may have adhered to the blades and then inwardly to retract the fingers again.

The operation of the chip-removing mechanism of either embodiment of the invention will be understood from the preceding description. However, the principle of operation of both mechanisms is further illustrated in the diagrammatic view of Fig. 6. Here, X is the axis of the cutter C whose cutting blades are denoted that B. Only two chip-removing fingers F are shown. The one at the left is associated with the second blade of the cutter and the one at the right with an intermediate blade spaced about 180° from the second blade. E denotes the eccentric control member or cam. It is formed with a circular groove P whose center is at Y eccentric of the axis X of the cutter. Each of the fingers F has a roller or stud S that engages in the groove P.

Figure 6:
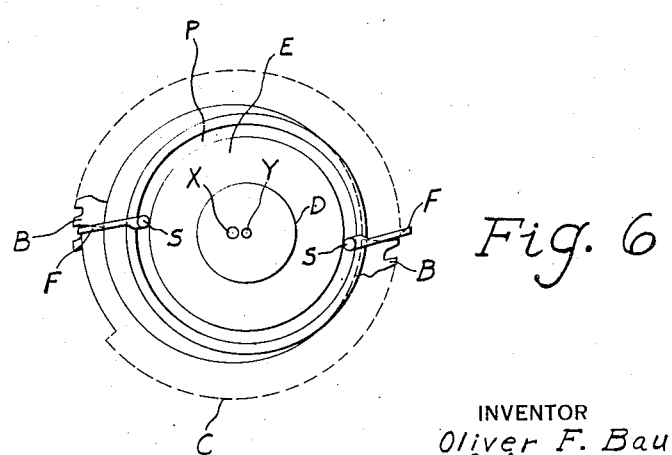
Fig. 6 is a diagrammatic plan view illustrating the principle of operation of the mechanism of this invention.

In the first embodiment of the invention illustrated in Figs. 1 to 3 inclusive, the eccentric is connected to the cutter to rotate therewith and it revolves on a bearing 31 which is denoted diagrammatically at D in Fig. 6 and which is eccentric of the axis X of the cutter. Thus, as the cutter revolves carrying the eccentric with it, each finger F is moved radially of the axis X of the cutter from the position such as shown at the left in Fig. 6, where it lies at the bottom of a cutting blade to the diametrically opposite position shown at the right of Fig. 6 where it has moved outwardly beyond the face of the cutting blade. In this movement, the finger will sweep off of the cutting blade any chip that may have adhered to the blade.

In the embodiment of the invention illustrated in Figs. 4 and 5, the ececntric E is stationary and the fingers F revolve with the cutter. Hence, as the cutter rotates, each finger is moved radially relative to the axis of the cutter to remove the chip from the blade with which it is associated as already described.

While the invention has been described in connection with a particular use, it will be understood that it may be employed with other types of cutting tools than that illustrated. It will be understood, also, that it is capable of further modification. The present application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A chip-removing mechanism for multibladed rotary gear cutters comprising a plate which is adapted to be secured to the cutter to rotate therewith, a plurality of fingers, each of which is associated with a given blade of the cutter. each finger being slidably mounted in the plate for reciprocation in a direction substantially parallel to the front face of the blade with which it is associated, a stationary cam member, and means operatively connecting the several fingers to the cam member so that on rotation of the cutter the fingers are actuated.

2. A chip-removing mechanism for multibladed rotary gear cutters comprising a plate adapted to be secured to the cutter to rotate therewith, a plurality of chip-removing members, each of which is slidably mounted in the plate for reciprocation in a direction substantially parallel to the front face of a blade of the cutter, a stationary member provided with a circular grove eccentric of the axis of rotation of the cutter, and means carried by each chip-removing member which engages in said groove so that during rotation of the cutter, the chip-removing member is reciprocated.

3. A chip-removing mechanism for multibladed rotary gear cutters comprising a plate adapted to be secured to the cutter to rotate therewith, a plurality of chip-removing members, each of which is slidably mounted in the plate for reciprocation in a direction substantially parallel to the front face of a blade of the cutter, a stationary member, a control member journaled on the stationary member for rotation about an axis eccentric of the axis of the cutter, said control member being provided with a circular groove concentric of its axis of rotation, means carried by each chip-removing member engaging in the groove so that during rotation of the control member, each chip-removing member is actuated, and means for rotating the control member on rotation of the plate.

4. A chip-removing mechanism for multibladed rotary gear cutters comprising a plate adapted to be mounted on the cutter for angular adjustment relative thereto and adapted to be secured to the cutter to rotate therewith after adjustment, a plurality of chip-removing members carried by the plate for wiping chips off different blades of the cutter, a gauge secured to the plate and adapted to be engaged with one of the blades of the cutter to control the positions of the chip-removing members relative to the front faces of the other blades, and means for actuating the chip-removing members as the cutter rotates.

5. The combination in a gear cutting machine of a rotary multi-bladed gear cutter and a detachable chip-removing mechanism therefor comprising a normally stationary part, a part rotatable thereon, and a plurality of chip-removing members carried by the rotatable part and adapted to be actuated on rotation of the rotatable part relative to the stationary part to wipe chips off the blades of the cutter, means for securing the rotatable part to the cutter, locking means carried by the machine for holding the normally stationary part against movement, and means preventing operation of the machine until the locking means is engaged with the normally stationary part of the mechanism.

6. A chip removing mechanism for multibladed rotary gear cutters comprising a plate which is adapted to be secured to a cutter to rotate therewith, a plurality of fingers, each of which is associated wtih a given blade of the cutter and each of which is slidably mounted in the plate for rectilinear reciprocation in a plane perpendicular to the axis of rotation of the cutter, and means operative on rotation of the cutter for reciprocating said fingers.

7. A chip removing mechanism for multibladed rotary gear cutters comprising a plate which is adapted to be secured to a cutter to rotate therewith, a plurality of fingers, each of which is associated with a given blade of the cutter and each of which is slidably mounted in the plate for rectilinear reciprocation in a plane perpendicular to the axis of rotation of the cutter, a stationary control member, and means operatively connecting the fingers with the control member whereby on rotation of the cutter, the fingers are reciprocated.

OLIVER F. BAUER.